(12) United States Patent
Yoshida et al.

(10) Patent No.: US 12,481,807 B2
(45) Date of Patent: Nov. 25, 2025

(54) PHYSICAL DISTRIBUTION SIMULATION SYSTEM

(71) Applicant: JGC JAPAN CORPORATION, Kanagawa (JP)

(72) Inventors: Nozomi Yoshida, Kanagawa (JP); Wataru Kobayashi, Kanagawa (JP); Takeshi Saito, Tokyo (JP); Yusuke Yamada, Tokyo (JP)

(73) Assignee: JGC JAPAN CORPORATION, Kanagawa (JP)

( * ) Notice: Subject to any disclaimer, the term of this patent is extended or adjusted under 35 U.S.C. 154(b) by 773 days.

(21) Appl. No.: 17/887,520

(22) Filed: Aug. 15, 2022

(65) Prior Publication Data

US 2023/0244829 A1    Aug. 3, 2023

(30) Foreign Application Priority Data

Jan. 28, 2022  (JP) .................................. 2022-011941

(51) Int. Cl.
*G06F 30/20*         (2020.01)
(52) U.S. Cl.
CPC ................................ *G06F 30/20* (2020.01)

(58) Field of Classification Search
CPC ................................. G06F 30/20; G06F 30/13
See application file for complete search history.

(56) References Cited

FOREIGN PATENT DOCUMENTS

| JP | 2017-194274 A | * | 10/2017 | ................ G21F 9/30 |
|----|---------------|---|---------|---------------------------|
| JP | 2020-91102 A  | * | 6/2020  | ................ G21F 9/30 |
| JP | 2021-26643 A  | * | 2/2021  | ................ G21F 9/00 |
| JP | 2021026643    |   | 2/2021  |                           |
| KR | 10-1897986 B1 | * | 9/2018  | ............ G06F 17/50   |

\* cited by examiner

*Primary Examiner* — Chuen-Meei Gan
(74) *Attorney, Agent, or Firm* — JCIPRNET

(57) ABSTRACT

The present invention is a physical distribution simulation system including: an input unit that inputs predetermined information regarding waste generated over time in a dismantling step of a structure to be dismantled; a calculation unit that calculates a storage step indicating a storage state of the waste, in a predetermined period from generation of the waste to transport of the waste to an inside of premises or outside of the premises on the basis of the predetermined information; and a display unit that displays a display image visualizing information indicating a change over time of the storage step in the predetermined period.

20 Claims, 6 Drawing Sheets

PHYSICAL DISTRIBUTION SIMULATION SYSTEM

CROSS-REFERENCE TO RELATED APPLICATION

This application claims the priority benefit of Japan application serial no. 2022-011941, filed on Jan. 28, 2022. The entirety of the above-mentioned patent application is hereby incorporated by reference herein and made a part of this specification.

BACKGROUND OF THE INVENTION

1. Technical Field

The present invention relates to a physical distribution simulation system that predicts a physical distribution process from generation to transport of waste.

2. Description of the Related Art

When a nuclear power facility is abolished, waste including radioactive waste and non-radioactive waste are generated. Among the waste, low-level radioactive waste and non-radioactive waste that are not radioactive waste are stored in the nuclear power facility for a predetermined period after generation. The stored waste is transported to a disposal site inside the premises or to a disposal site outside the premises, or for reuse outside the premises. For the waste to be stored, all steps are managed as physical distribution in a long period of time until the waste is transported to the inside of the premises or the outside of the premises through a facility dismantling step, a treatment step such as decontamination, a storage step, and the like.

The waste is stored using an empty space in the premises. The storage capacity of the waste in the empty space is limited, and it is desirable that a series of physical distribution from generation to transport of the waste is performed without a delay. When the storage capacity of the waste is not secured and a delay occurs during the physical distribution of the waste, there is a risk that the waste stays, dismantling work is interrupted, and decommissioning is delayed. Therefore, it is possible to take measures in advance if it is possible to grasp a generation amount and a storage amount of the waste over time within a future period from the start of dismantling of the nuclear power facility to the time when the waste is transported through storage, and to grasp what measures are required at a certain time.

A management system described in JP 2021-26643 A manages a storage amount of waste on the basis of a current state of the waste, and does not calculate future physical distribution of the waste.

SUMMARY OF THE INVENTION

One aspect of the present invention is a physical distribution simulation system including: an input unit configured to input predetermined information regarding waste generated over time in a dismantling step of a structure to be dismantled; a calculation unit configured to calculate a storage step indicating a storage state of the waste, in a predetermined period from generation of the waste to transport of the waste to an inside of premises or outside of the premises on a basis of the predetermined information; and a display unit configured to display a display image that visualizes information indicating a change over time of the storage step during the predetermined period, in which the input unit enables input of a waste amount of the waste generated over time, a storage capacity that is an empty space in the premises where the structure is installed and changes over time in a storage area for storing the waste, information regarding a treatment time required for a treatment step for treating the waste generated in the dismantling step, information regarding a transport time required for transport of the waste stored in the storage area, a conversion factor for converting the waste amount into the number of containers each having a predetermined capacity, a transport condition indicating a frequency of transporting the container, and the waste amount to be removed, the waste amount to be moved, and the waste amount according to a storage form, during a period from the dismantling step to the storage step, the calculation unit calculates the number of containers using the waste amount and the conversion factor, calculates, for each of the containers, a time from the generation of the waste to transport of the container through the treatment step and the storage step, on the basis of the information regarding the treatment time and the information regarding the transport time, calculates a storage amount over time of the containers stored in the storage area on the basis of the number of containers generated in the storage area or carried into the storage area and the number of containers carried out from the storage area, calculates the storage capacity over time that increases or decreases due to removal of the waste, movement of the waste, and the storage form of the waste during the period from the dismantling step to the storage step, and calculates a storage free capacity indicating a free capacity capable of storing the container in the storage area, on the basis of the storage capacity and the storage amount, and the display unit displays a first display image that enables visual recognition of a physical distribution process of the container from the generation to transport of the container, and a second display image that displays changes over time of the storage free capacity and the storage amount existing in the storage area in the predetermined period.

DETAILED DESCRIPTION

An object of the present invention is to provide a physical distribution simulation system capable of simulating future physical distribution from storage to transport of waste generated with dismantling a nuclear power facility.

To enable simulation of future physical distribution from storage to transport of waste generated with dismantling a nuclear power facility.

In processes of dismantling a nuclear power facility having a nuclear reactor in a building involved in decommissioning, waste is generated when structures such as a nuclear reactor main body, nuclear reactor peripheral equipment, and a building are dismantled. Hereinafter, a disposal plan for low-level radioactive waste and non-radioactive waste to be treated among waste generated with decommissioning will be described. The waste generated with decommissioning includes radioactive waste contaminated with radioactive materials and non-radioactive waste not contaminated with radioactive materials. The low-level radioactive waste is classified into waste with a relatively high radioactivity level L1, waste with a relatively low radioactivity level L2, and waste with a very low radioactivity level L3 in descending order of the radioactivity level. The L1 and L2 wastes are transported to a disposal site outside the premises.

In the present embodiment, decommissioning of low-level radioactive waste (L3), waste that does not need to be treated as radioactive waste (CL), and non-radioactive waste (NR) will be described. For example, the L3 waste, the CL waste, and the NR waste are divided into sizes that can be stored in containers (see FIG. 2) having a predetermined shape and a predetermined capacity after decontamination treatment is performed in the building, and are stored in a state of being stored in the containers. The containers are given individually identifiable IDs. Information such as the ID, a type of internal waste, and the radioactivity level is recorded in association with each other, and a storage period corresponding to the content and the radioactivity level is set for the container. The storage period is set to a period in which the radioactivity level of the waste is equal to or less than a criterion. The decommissioning plan needs to be formulated so that a storage amount of the containers in a storage area to be described below does not exceed a storage capacity.

Figure 1:
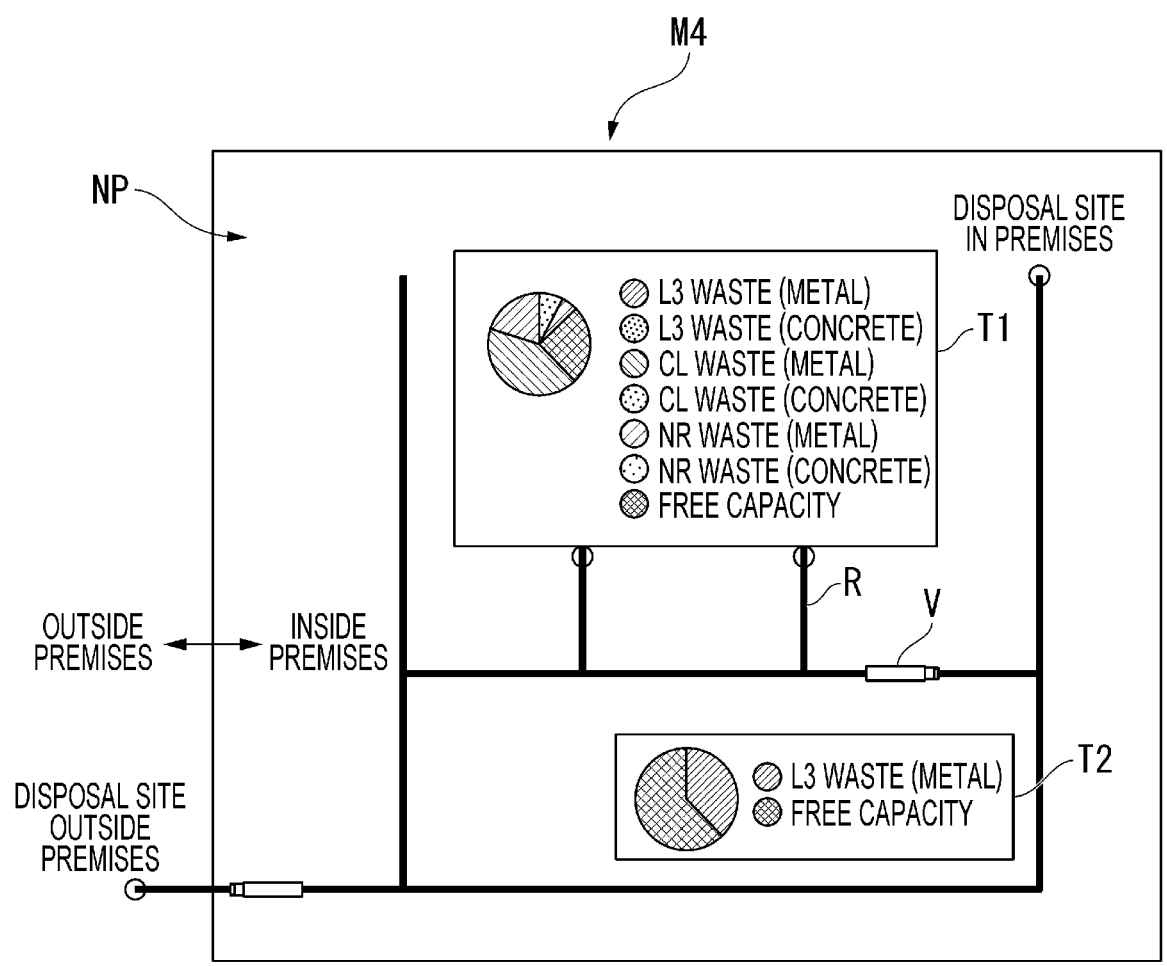
FIG. 1 is a diagram illustrating an example of a nuclear power facility according to an embodiment of the present invention.

Hereinafter, a configuration of a nuclear power facility to be simulated in the present embodiment will be described with reference to FIGS. 1 and 2. In the present embodiment, an area inside a nuclear power facility NP is referred to as an inside of premises, and an area outside the nuclear power facility NP is referred to as an outside of the premises. As illustrated in FIG. 1, the nuclear power facility NP includes a building T. The present embodiment includes a first building T1 and a second building T2. A movement route on which a vehicle V loaded with containers moves is defined between the first building T1 and the second building T2. The number of buildings may be one or two or more. The number of buildings may be increased or decreased in the course of decommissioning.

Figure 2:
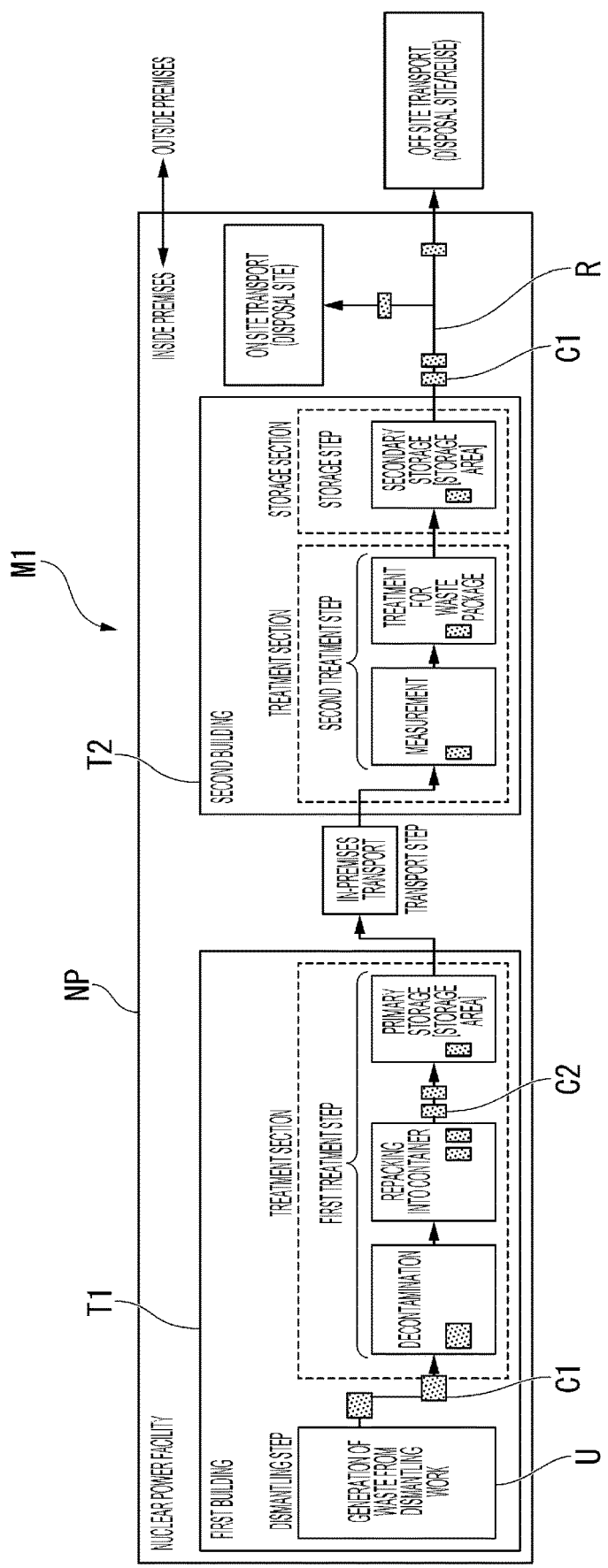
FIG. 2 is a block diagram illustrating a waste treatment flow.

FIG. 2 is a diagram schematically illustrating a physical distribution process in the nuclear power facility NP. The first building T1 is a building in which equipment necessary for power generation, such as a nuclear reactor or a turbine, is installed as a structure U. In the first building T1, a dismantling step of dismantling the structure U and a treatment step of treating waste generated in the dismantling step are performed. Hereinafter, the treatment step performed in the first building T1 is referred to as a first treatment step. In the present embodiment, as the first treatment step, steps regarding decontamination, container repacking, and primary storage are exemplified.

The second building T2 is a building in which no object to be dismantled is installed, but various types of treatment and storage are performed for the containers that are carried in. In the second building T2, a treatment step for further treating the containers carried in from the first building T1 and a storage step for storing the containers made storable by the treatment step are performed. Hereinafter, the treatment step performed in the second building T2 is referred to as a second treatment step. In the present embodiment, as the second treatment step, steps regarding measurement and treatment for waste package are exemplified.

In the present embodiment, the waste is generated in the first building T1 in which the structure U is installed and stored in the container. The container in which the waste is stored is transferred to the second building T2 in which the storage area is secured through the first treatment step. Thereafter, the container is transported to the inside of the premises or the outside of the premises through the second treatment step in the second building T2. As illustrated in FIG. 2, the container is carried out onsite transport toward a disposal site in the inside of the premises, or is carried out offsite transport to a disposal site in the outside of the premises or is transported outside the premises for reuse. Hereinafter, the transport of the container to the inside of the premises or the outside of the premises may be simply referred to as transport. The container is carried out from the first building T1, transported (transport step) inside the premises, and carried into the second building T2. The container carried out from the first building T1 is loaded on, for example, the vehicle V illustrated in FIG. 1 and transported in the premises.

The storage area is an area for storing the waste in the premises where the structure U is installed. In the present embodiment, the storage area is a vacant space in the building. The container in which the waste is stored is stored in the storage area inside the building. In the storage area, there are an existing space that has already been used as a storage location of the container before dismantling operation, and an additional space that becomes able to be used as a storage location of the container by dismantling the structure U. The additional space changes over time with the dismantling operation. In the present embodiment, the storage capacity is the number of storable containers calculated according to a floor area of the storage area. Specifically, the storage capacity is set in consideration of a volume (for example, a height) of a space where the structure U is not installed between a floor surface and a ceiling in the building and a limitation of floor load capacity, in addition to the floor area of the storage area. The storage capacity changes over time on the basis of a sum of the existing space and the additional space. The container having passed the storage period is transported to the disposal site in the premises or to the outside of the premises.

The storage amount is the number of containers actually stored in the building. The storage free capacity is a capacity obtained by subtracting the storage amount at a predetermined point of time from the storage capacity.

A transport destination of the container is a radioactive waste treatment facility, a storage facility, a disposal site, or the like. As described above, in dismantling the nuclear power facility NP, a management period from the start of the dismantling to the transport of the waste is long, and the treatment steps performed for the waste during the management period are a series of steps. Therefore, there is a possibility of a delay in the overall treatment even if any one of the treatment steps is delayed. Therefore, it is necessary to grasp in advance what state the physical distribution of the waste from the generation to the transport of the waste will be in the future.

Hereinafter, a physical distribution simulation system that visualizes physical distribution from the generation to the transport of the waste in the dismantling step for the structure U provided in the nuclear power facility NP or the like to be dismantled will be described. The physical distribution simulation system simulates a future state of the generated waste.

Figure 3:
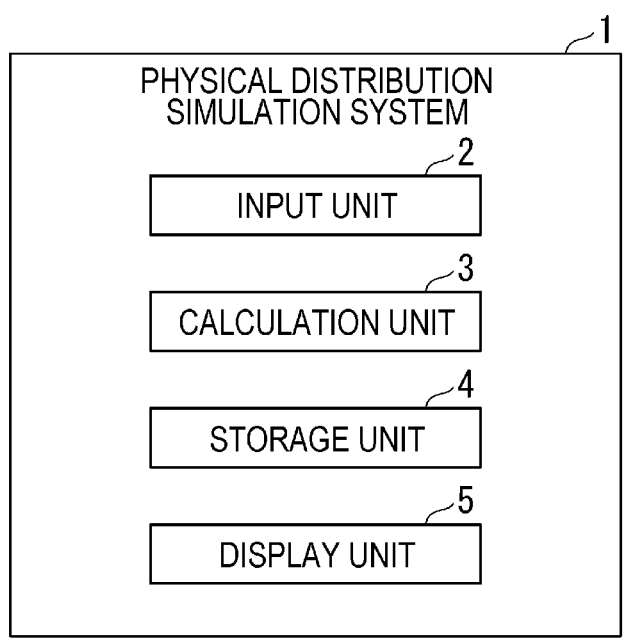
FIG. 3 is a block diagram illustrating a configuration of a physical distribution simulation system.

As illustrated in FIG. 3, a physical distribution simulation system 1 includes, for example, an input unit 2 that inputs information necessary for simulation, a calculation unit 3 that calculates a state of the waste on the basis of input data, a storage unit 4 that stores data necessary for calculation, and a display unit 5 that displays a display image based on a calculation result. The physical distribution simulation system 1 includes, for example, an information processing terminal device capable of inputting and outputting information, such as a personal computer.

The input unit 2 is, for example, an interface that inputs information on the basis of a display image displayed on the display unit 5. The input unit 2 includes an input device such as a touch panel, a keyboard, and voice input. In the case where the input unit 2 is a touch panel, the input unit 2 may include the display unit 5. The input unit 2 is configured to input predetermined information regarding the waste generated over time in the dismantling step for the structure U of the nuclear power facility NP to be dismantled.

The calculation unit 3 calculates the storage step indicating a storage state of the waste, in a predetermined period from the generation to the transport of the waste on the basis of the predetermined information. The calculation unit 3 is implemented by, for example, a hardware processor such as a central processing unit (CPU) executing a program (software). Some or all of these components may be implemented by a hardware (circuit unit including circuitry) such as a large scale integration (LSI), an application specific integrated circuit (ASIC), a field-programmable gate array (FPGA), or a graphics processing unit (GPU), or may be implemented by cooperation of software and hardware. The program may be stored in a storage device (a storage device including a non-transitory storage medium) such as an HDD or a flash memory provided in the storage unit 4 in advance, may be stored in a removable storage medium (a non-transitory storage medium) such as a DVD or a CD-ROM, or may be installed in the storage device by attaching the storage medium to a drive device.

The display unit 5 is, for example, a display device such as a liquid crystal display, an organic electro-luminescence (EL) display, or a touch panel. The display unit 5 displays a display image that visualizes information indicating a change over time in the storage step during the predetermined period.

Figure 4:
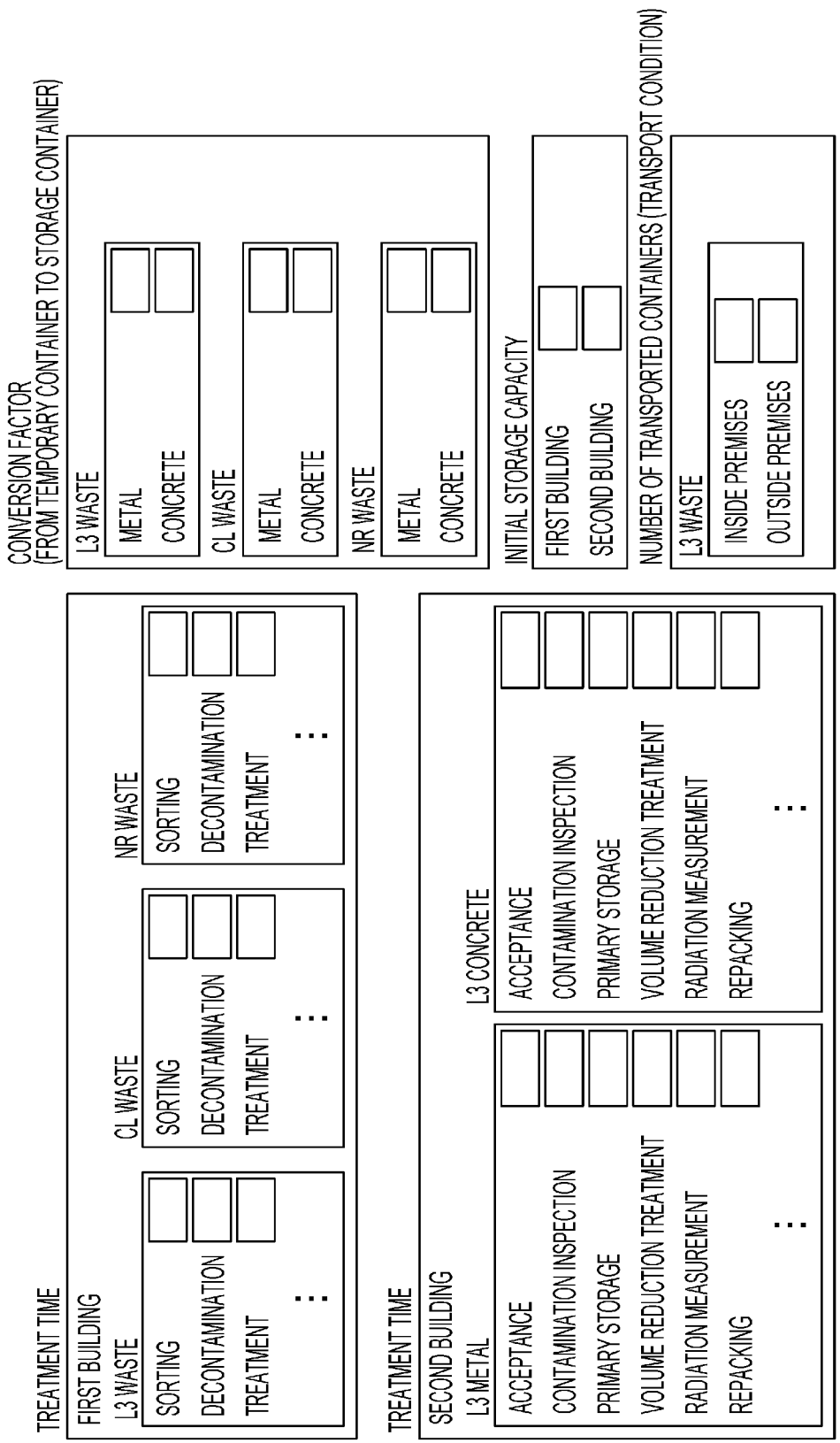
FIG. 4 is a diagram illustrating an example of an input image for inputting predetermined information regarding waste.

FIG. 4 illustrates an example of an input image P for inputting the predetermined information regarding the waste. The input image P is displayed on the display unit 5 and constitutes the input unit 2. The input image P can be arbitrarily set, and the predetermined information can be appropriately added and corrected. The predetermined information is input with most likely values that have been perfectly arranged as an initial condition. The predetermined information may be appropriately changed and added.

The predetermined information includes, for example, a waste amount generated over time, the storage capacity changing over time, and information regarding a treatment time required for the treatment step. The input image P enables input of information regarding a transport time required until the waste (container) stored in the storage area is transported to the inside of the premises or the outside of the premises, a transport condition indicating a frequency of executing the transport, and a conversion factor for converting the waste amount into the number of containers each having a predetermined capacity. The container may be singly defined or defined in units of a plurality of containers.

The waste amount in the predetermined information is set, for example, for each type of waste. In the predetermined information, L3 waste having an extremely low radioactivity level to be stored, CL waste that does not need to be treated as radioactive waste, and NR waste that is non-radioactive waste are set. Each type of waste is further classified into concrete waste composed of concrete and metal waste composed of metal.

The input image P enables input of information regarding the treatment time required for the first treatment step performed in the first building T1 and the second treatment step performed in the second building T2, and information regarding a transport time required for the transport step of transporting the container from the first building T1 to the second building T2.

In the predetermined information, the treatment time is a time required for the treatment step for treating the waste generated in the dismantling step for the structure U. The treatment step includes a plurality of steps such as sorting, decontamination, container repacking, inspection, measurement, and primary storage of containers, for example. The plurality of steps may include a temporary storage step for temporary storage and a transportation step in the middle of each treatment step. The treatment step includes an L3 treatment step for treating the L3 waste, a CL treatment step for treating the CL waste, and an NR treatment step for treating the NR waste.

The input image P enables input of information regarding generation amounts of the L3 waste, the CL waste, and the NR waste. For example, the input image P may individually enable input of ratios of the L3 waste, the CL waste, and the NR waste. Further, the treatment step includes a concrete treatment step for treating the concrete waste and a metal treatment step for treating the metal waste. The input image P may enable input of information regarding generation amounts according to the types of the concrete waste and the metal waste. For example, the input image P may individually enable input of an actual generation amount, or may enable input of the ratio.

Among the predetermined information, a transport time is a time required for the waste (container) stored in the storage area to be transported to the disposal site in the premises or to the outside of the premises. As the transport time, a direct time may be input or a calculation formula for time conversion may be input. Further, the input image P may enable input of a cost required for the treatment step. The input image P may enable input of the waste amount to be removed, the waste amount to be moved, and the waste amount according to the storage form such as temporary storage and primary storage between the dismantling step and the storage step.

The input unit 2 enables input of an acceptance logic indicating information regarding processing capability of each of a plurality of steps included in the treatment step and an order of the plurality of steps. The input image is, for example, an image for selecting and inputting each treatment illustrated in FIG. 2 or FIG. 4 according to the nuclear power facility. The display unit 5 displays an input image (not illustrated) of the acceptance logic. In the input image, for example, each step from the dismantling step of the L3 waste in the building to the transport to the inside of the premises or the outside of the premises through each treatment step and storage step is visualized by a flow logic (not illustrated) obtained by subdividing the treatment flow of FIG. 2.

Flow logics of a plurality of treatments executed in each step can be input to the input image. Each treatment can be arbitrarily set, added, and deleted. The flow can be freely changed according to the type and amount of the waste, customer's request, and the like. In the flow logic, an icon indicating the treatment and an arrow indicating a flow of the treatment input between an icon and an icon are illustrated. The flow logic visualizes the flow of treatment executed in each step such as branching and integration of treatment, and parallel treatment.

The calculation unit 3 calculates the storage step indicating a storage state of the waste, in a predetermined period from the generation to the transport of the waste on the basis of the data regarding the predetermined information input through the input image P. For example, the calculation unit 3 calculates the number of containers using the input waste amount and the conversion factor. The conversion factor is, for example, a conversion ratio (the number/storage amount ton) from the generation amount of the waste to the number of containers. The storage amount per container is calculated by a storage rate of the waste×a specific gravity of the waste×an inner volume of the container. The number of containers may be singular or plural. As a result, the generation amount and the storage amount of the waste are calculated on the basis of the number of containers.

The container includes a temporary container C1 and a storage container C2. The temporary container C1 is a container that accommodates the waste generated in dismantling work. Further, the temporary container C1 is used when the container is temporarily stored in the process of the treatment step. The storage container C2 is a container suitable for inspection necessary for transport and the transport repacked with the waste in the temporary container C1. The calculation unit 3 converts the generation amount of the waste into a generation amount per arbitrary time unit on the basis of the calculation result. For example, the calculation unit 3 converts the generation amount of the waste in an arbitrary unit such as per hour, per day, or per week. The calculation unit 3 generates a display screen (not illustrated) indicating the generation amount of the waste, and causes the display unit 5 to display the display screen. In the present embodiment, the storage capacity is a totaled amount of the storage capacity of the temporary container C1 that is temporarily stored and the storage capacity of the storage container C2. Further, the storage amount is a total of the temporary container C1 and the storage container C2 that are actually stored.

The display unit 5 may display a display screen (not illustrated) indicating the generation amount of the waste. The display screen displays the generation amount of the waste per hour for each type of waste. The calculation unit 3 calculates an overall step flow from the generation of the waste to the transport of the container to the inside of the premises or the outside of the premises through the treatment step and the storage step, on the basis of the information regarding the treatment time and the information regarding the transport time input through the input image P and the input acceptance logic. The calculation unit 3 calculates the number of containers acceptable and timing of acceptance in each of a plurality of steps on the basis of data regarding the predetermined information input through the input image P.

The calculation unit 3 calculates the time from the generation to the transport of the waste for each container on the basis of the ID attached to the container and added information. As a result, the time required from when one container is generated to when the container is transported is calculated. The calculation unit 3 individually calculates the times from when the L3 waste, the CL waste, and the NR waste are generated to when the L3 waste, the CL waste, and the NR waste are transported to the inside of the premises or the outside of the premises through the L3 treatment step, the CL treatment step, and the NR treatment step.

The calculation unit 3 of the present embodiment adjusts a movement time and timing so as to accept the number of containers that can be treated at one time in the treatment step, and prevents the containers from staying in each treatment step. For example, the measurement illustrated in FIG. 2 is treatment of measuring one container at one time. In a case where there are two measurement targets, the calculation unit 3 moves the next container to a measurement section after completing the measurement of the previous container. The calculation unit 3 calculates the timing of moving the container on the basis of the information such as the number of containers that can be treated and time input in advance to the input image P, and displays the timing as a physical distribution process as described below.

The calculation unit 3 individually calculates the time from when the concrete waste and the metal waste are generated to when the concrete waste and the metal waste are transported to the inside of the premises or the outside of the premises through the concrete treatment step and the metal treatment step. In a case where the concrete waste and the metal waste are stored in the same storage area, the calculation unit 3 calculates the storage amount over time of the container obtained by totaling the concrete waste and the metal waste. The calculation unit 3 generates a first display image M1 that enables visual recognition of the physical distribution process of the container from generation to transport of the container, and displays the first display image M1 on the display unit 5.

The first display image M1 is an image that displays the treatment flow of FIG. 2 in detail on the basis of the acceptance logic. Here, the first display image M1 will be described with reference to FIG. 2. In the first display image M1, a plurality of types of containers according to the radioactivity level of the waste is displayed in an identified mode such as an icon, and the treatment flow of each of the waste is displayed. Further, in the first display image M1, treatment performed for each type of the containers generated or carried in the building is displayed as a flowchart. The first display image M1 of the present embodiment displays a representative treatment flow for a type of waste for convenience. In the first display image M1, the icon of the container sequentially moves along each treatment illustrated in the flowchart of a flow from the generation in the first building T1 to in-premises transport toward the second building T2 through each treatment step, a flow of carrying-in to the second building T2, and a flow of the transport from the second building T2 to the inside of the premises or the outside of the premises.

In the first display image M1, the number of containers treated in each step is displayed. An administrator can visually recognize which treatment step is performed for the containers for each type of the containers and the number of continuing containers in each treatment step on the basis of the first display image M1. The administrator can visually simulate the physical distribution process of the containers in the building on the basis of the first display image M1.

In the first display image M1 of the present embodiment, an area in which a treatment step is performed is displayed as a treatment section, and an area in which the container is stored is displayed as a storage section. The treatment section and the storage section are conceptual sections for describing the physical distribution process, and are different from physically set areas in the actual building. Therefore, in the actual building, the treatment and storage may be performed in the same area (room), or may be performed in different areas (rooms). In FIG. 2, the primary storage of the storage container C2 is displayed in the treatment section as the first treatment step, but the actual storage container C2 is placed in the storage area. The primary storage may be displayed in the storage section as a storage step. The storage section and the storage area are not necessarily synonymous.

In the first display image M1, a process over time is displayed, in which the container enters the treatment section, stays during the treatment time elapsed after the treatment step is performed, leaves the treatment section, enters the storage section, stays during a storage time in the storage step, and leaves the storage section.

In the first display image M1 of the present embodiment, the physical distribution process calculated by the calculation unit 3 according to the input information is displayed as a moving image. In the present embodiment, the structure U (waste) dismantled in the first building T1 is stored in the temporary container C1 and enters the treatment section. The temporary container C1 enters the decontamination step and stays in a section of the decontamination step for a time required for the decontamination treatment. Next, the temporary container C1 is converted into the storage container C2 in a container repacking step, and stays in a container repacking section for a time required for repacking. Next, the storage container C2 stays in a primary storage section for a time input as the primary storage. The storage container C2 after the primary storage is transported in the premises and carried to the second building T2. At this time, the storage container C2 is moved to the second building T2 over the time input as an in-premise transport time. As in the first building T1, the storage container C2 stays in the treatment section for a time required for the second treatment step and is secondarily stored. The container that has passed the input secondary storage time is transported to the inside of the premises or the outside of the premises. At this time, the storage container C2 is transported to the inside of the premises or the outside of the premises over the time input as the transport time. As described above, the first display image M1 can simulate the actual physical distribution process of the waste by visualizing the physical distribution process of the containers in consideration of time.

The calculation unit 3 calculates the storage amount over time of the containers stored in the storage area on the basis of the number of containers stored in the storage area and the number of containers carried out from the storage area. The calculation unit 3 calculates the storage capacity over time that increases or decreases according to removal of the waste, movement of the waste, and the storage form of the waste between the dismantling step and the storage step on the basis of the waste amount to be removed, the waste amount to be moved, and the waste amount according to the storage form of the waste between the dismantling step and the storage step which are input.

The calculation unit 3 calculates the storage free capacity with respect to the storage amount on the basis of the calculated storage amount and storage capacity. As a result, the calculation unit 3 can calculate the storage step indicating a storage status of the container from the generation to the transport of the container.

In the management period from the start of dismantling of the structure U to the end of transport of all types of waste, the calculation unit 3 integrates the storage amount over time of the containers stored in the storage area for each day to calculate a total storage amount for each day. The calculation unit 3 calculates the storage amount of the waste for each type for all days within the management period. The calculation unit 3 calculates a change over time in the storage amount on a daily, weekly, or monthly basis. The calculation unit 3 calculates the daily, weekly, and monthly storage amounts in units of one year, five years, and twenty years, for example.

The calculation unit 3 calculates a storage free capacity indicating a free capacity capable of storing the container in the storage area on the basis of the storage capacity and the calculated storage amount. The calculation unit 3 generates a second display image that displays changes over time of the free capacity existing in the storage area and the storage amount in the management period, and causes the display unit 5 to display the second display image on the basis of the calculation result. The calculation unit 3 generates a graph displaying changes over time of the free capacity existing in the storage area and the storage amount including the concrete waste and the metal waste in the second display image.

Figure 5A:
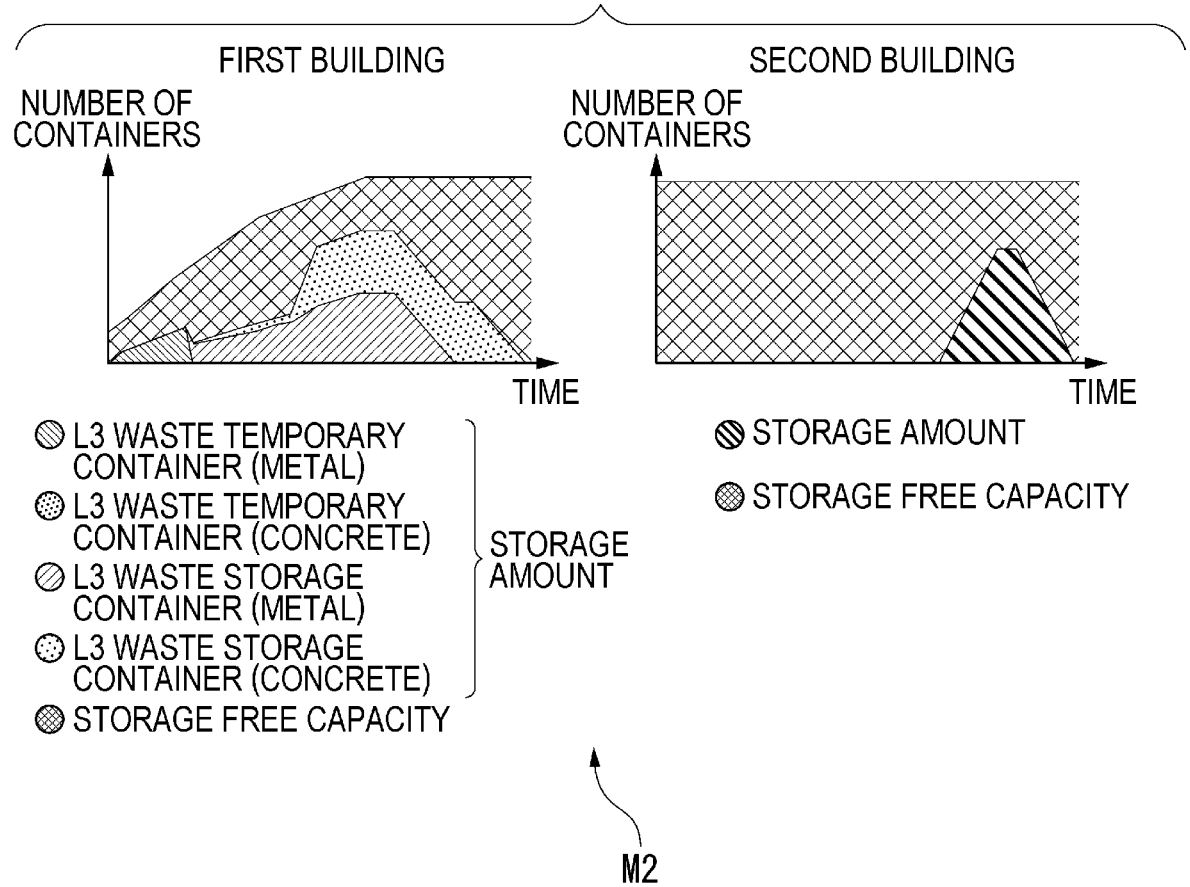
FIG. 5A is graphs illustrating an example of a second display image displayed on a display unit.

FIG. 5A illustrates an example of the second display image M2 displayed on the display unit 5. In the second display image M2, for example, the storage amount is displayed for each type of container. The storage amount is displayed by a graph in a short to long period such as one year daily, five years weekly, or twenty years monthly. The graph displays changes over time of the free capacity existing in the storage area and the storage amount including the concrete waste and the metal waste. The graph also displays the free capacity together with the storage amount. The administrator can confirm the changes over time of the free capacity existing in the storage area and the storage amount in a short to long period. The illustrated second display image M2 is an example, and may be generated in another display mode as long as the changes over time of the free capacity existing in the storage area and the storage amount in the management period can be displayed.

Figure 5B:
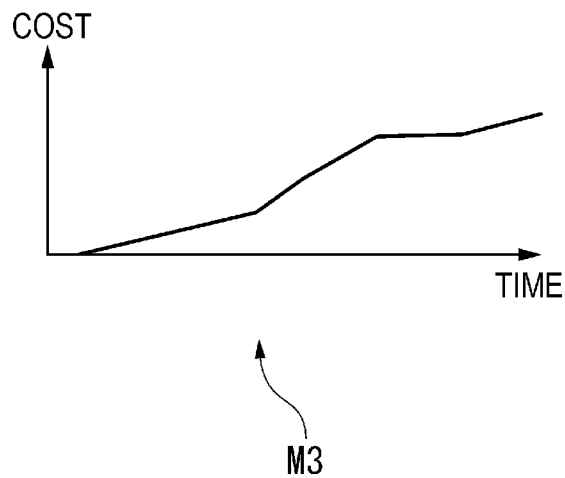
FIG. 5B is a graph illustrating an example of a third display image.

FIG. 5B illustrates a third display image M3 illustrating a change in overall cost over time. The calculation unit 3 calculates the overall cost for the treatment step on the basis of cost data input in the input image P, generates the third display image M3 indicating a change in the calculated overall cost over time, and causes the display unit 5 to display the third display image M3. For the overall cost, conditions of input data at the end of waste treatment and input data of cost required for each treatment can be changed. As a result, it is possible to simulate patterns of various cost changes in the management period.

FIG. 1 illustrates a fourth display image M4 in which a movement route R indicating a route on which the container moves, the first building T1, and the second building T2 are displayed. The movement route R is illustrated between the first building T1 and the second building T2. The vehicle V that transports the container is illustrated on the movement route R. In the fourth display image M4, a state in which the container is loaded on the vehicle V and then moves on the movement route R is displayed over time. In the fourth display image M4, a state in which the vehicle V arrives at the second building T2 and stops while unloading the container is displayed over time. The calculation unit 3 displays movement over time of the container in the fourth display image M4 as a moving image, in which the container moves along the movement route R, enters the first building T1, moves from the first building T1 to the second building T2, and is transported from the second building T2.

As described above, according to the physical distribution simulation system 1, it is possible to simulate future physical distribution from storage to transport of the waste generated with dismantling the nuclear power facility NP. According to the physical distribution simulation system 1, it is possible to visualize the physical distribution of the waste from the generation to the transport of the waste through the storage step on the basis of the display image displayed on the display unit 5. According to the physical distribution simulation system 1, it is possible to graph the storage state of the waste stored in the storage section in a certain period in the storage period of the waste on the basis of the display image displayed on the display unit 5.

According to the physical distribution simulation system 1, it is possible to calculate a series of costs related to the physical distribution, setting the CL waste and the NR waste to be the waste to be managed on the basis of the display image displayed on the display unit 5. According to the physical distribution simulation system 1, it is possible to calculate the cost corresponding to various conditions that will change in the future by changing the input conditions as to when the treatment of the waste ends and how much cost is required in the management period on the basis of the display image displayed on the display unit 5.

Although a mode for carrying out the present invention has been described above using the embodiment, the present invention is not limited to the embodiment at all, and various modifications and substitutions can be made without departing from the gist of the present invention. For example, the physical distribution simulation system 1 may be applied to physical distribution simulation of not only the L3 waste, the CL waste, and the NR waste but also the L1 waste and the L2 waste.

Figure 6:
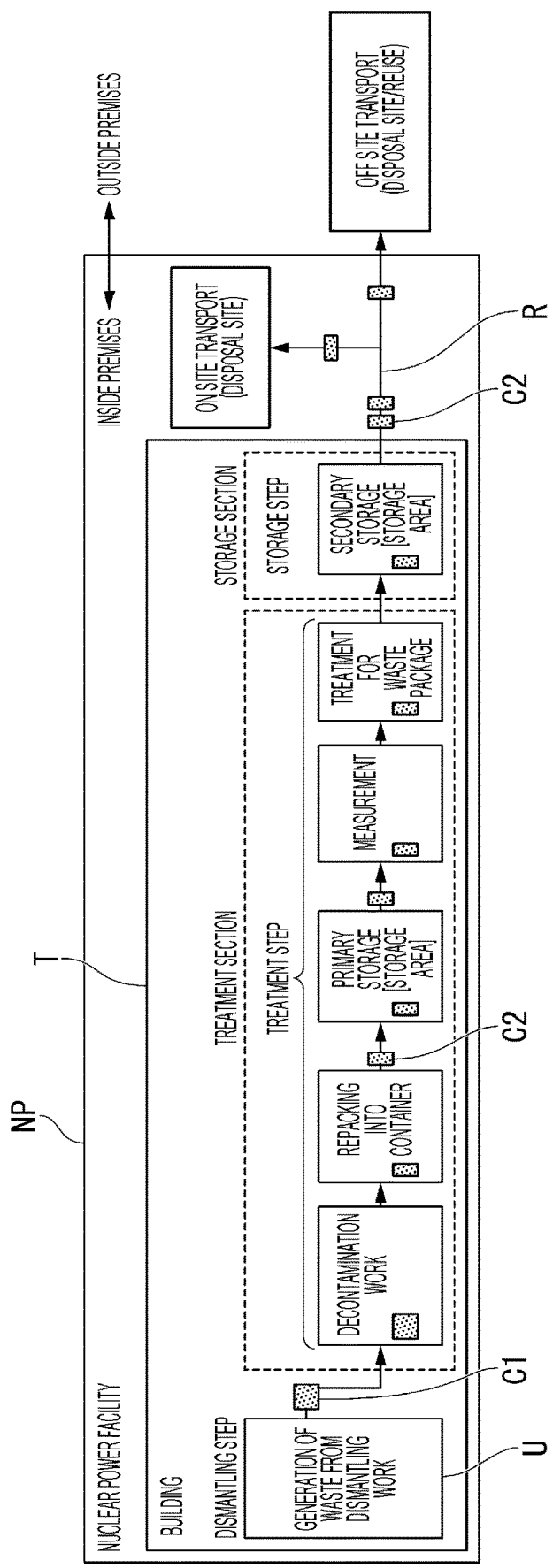
FIG. 6 is a block diagram illustrating a waste treatment flow according to another embodiment.

In the above-described embodiment, the case where the nuclear power facility NP includes the first building T1 and the second building T2 has been described, but the present embodiment is not limited to the case. As illustrated in FIG. 6, the nuclear power facility NP may include one building T, and the dismantling step, the treatment step, and the storage step may be performed in the one building T. That is, the physical distribution simulation system 1 can also perform simulation based on one building T. Further, as a result of the simulation, in a case where construction of the second building T2 becomes necessary in the process of decommissioning, it is also possible to add the second building T2 and perform simulation.

In the above-described embodiment, the case where the storage area is an empty space in the building has been described, but the present embodiment is not limited to the case. In a case where the structure U to be dismantled is the building itself, the storage area may be an empty space outdoors. That is, the storage area is an empty space in the premises, and a space can be input as the storage area as long as the space has a size for storing the waste.

In the above-described embodiment, the steps illustrated in FIG. 2 are exemplified as the treatment steps (the first treatment step and the second treatment step), but the types of the treatment steps are not limited thereto. Different types of treatment may be performed according to the type of waste, and the number of steps is not limited. The treatment step can be freely set according to the type of waste in the process of constructing the physical distribution simulation system 1.

In the above-described embodiment, the case in which the storage capacity is a totaled amount of the storage capacity of the temporary container C1 and the storage capacity of the storage container C2, and the storage amount is a total of the temporary container C1 and the storage container C2 that are actually stored. However, the storage capacity and the storage amount may be calculated with the temporary container C1 alone or may be calculated with the storage container C2 alone.

What is claimed is:

1. A physical distribution simulation system for simulating future physical distribution from storage to transport of waste generated with dismantling a nuclear power facility, comprising:
   an input unit configured to input predetermined information regarding waste generated over time in a dismantling step of a structure to be dismantled;
   a calculation unit configured to calculate a storage step indicating a storage state of the waste, in a predetermined period from generation of the waste to transport of the waste to an inside of premises or outside of the premises on a basis of the predetermined information; and
   a display unit configured to display a display image that visualizes information indicating a change over time of the storage step during the predetermined period, wherein
   the input unit enables input of
       a waste amount of the waste generated over time,
       a storage capacity that is an empty space in the premises where the structure is installed and changes over time in a storage area for storing the waste,
       information regarding a treatment time required for a treatment step for treating the waste generated in the dismantling step,
       information regarding a transport time required for transport of the waste stored in the storage area,
       a conversion factor for converting the waste amount into the number of containers each having a predetermined capacity,
       a transport condition indicating a frequency of carrying the container out, and
       the waste amount to be removed, the waste amount to be moved, and the waste amount according to a storage form, during a period from the dismantling step to the storage step,
   the calculation unit
       calculates the number of containers using the waste amount and the conversion factor,
       calculates, for each of the containers, a time from the generation of the waste to transport of the container through the treatment step and the storage step, on a basis of the information regarding the treatment time and the information regarding the transport time,
       calculates a storage amount over time of the containers stored in the storage area on a basis of the number of containers generated in the storage area or carried into the storage area and the number of containers carried out from the storage area,
       calculates the storage capacity over time that increases or decreases due to removal of the waste, movement of the waste, and the storage form of the waste during the period from the dismantling step to the storage step, and
       calculates a storage free capacity indicating a free capacity capable of storing the container in the storage area, on a basis of the storage capacity and the storage amount, and
   the display unit displays a first display image that enables visual recognition of a physical distribution process of the container from the generation to transport of the container, and a second display image that displays changes over time of the storage free capacity existing in the storage area and of the storage amount, in the predetermined period to provide information of possibility of a delay in the overall treatment if one or more of the treatment steps is delayed.

2. The physical distribution simulation system according to claim 1, wherein the waste is generated in a first building in which the structure is installed, transferred to a second building in which the storage area is secured through a first treatment step in the first building, and transported from the second building through a second treatment step in the second building, and the input unit enables input of
the storage capacity that changes over time in the second building,
information regarding the treatment time required for the first treatment step performed in the first building and the second treatment step performed in the second building, and
information regarding a transport time required for a transport step of transporting the container from the first building to the second building.

3. The physical distribution simulation system according to claim 1, wherein the input unit enables input of an acceptance logic including information regarding treatment capability of each of a plurality of steps included in the treatment step and an order of the plurality of steps, and the calculation unit calculates the number of the containers acceptable and timing of acceptance in each of the plurality of steps on a basis of the acceptance logic.

4. The physical distribution simulation system according to claim 2, wherein the input unit enables input of an acceptance logic including information regarding treatment capability of each of a plurality of steps included in the treatment step and an order of the plurality of steps, and the calculation unit calculates the number of the containers acceptable and timing of acceptance in each of the plurality of steps on a basis of the acceptance logic.

5. The physical distribution simulation system according to claim 3, wherein the input unit enables input of types of the plurality of steps included in the treatment step.

6. The physical distribution simulation system according to claim 4, wherein the input unit enables input of types of the plurality of steps included in the treatment step.

7. The physical distribution simulation system according to claim 1, wherein the input unit enables input of a cost required for the treatment step, the calculation unit calculates an overall cost for the treatment step on a basis of the input cost, and the display unit displays a third display image that displays a change over time of the calculated overall cost.

8. The physical distribution simulation system according to claim 2, wherein the input unit enables input of a cost required for the treatment step, the calculation unit calculates an overall cost for the treatment step on a basis of the input cost, and the display unit displays a third display image that displays a change over time of the calculated overall cost.

9. The physical distribution simulation system according to claim 3, wherein the input unit enables input of a cost required for the treatment step, the calculation unit calculates an overall cost for the treatment step on a basis of the input cost, and the display unit displays a third display image that displays a change over time of the calculated overall cost.

10. The physical distribution simulation system according to claim 4, wherein the input unit enables input of a cost required for the treatment step, the calculation unit calculates an overall cost for the treatment step on a basis of the input cost, and the display unit displays a third display image that displays a change over time of the calculated overall cost.

11. The physical distribution simulation system according to claim 5, wherein the input unit enables input of a cost required for the treatment step, the calculation unit calculates an overall cost for the treatment step on a basis of the input cost, and the display unit displays a third display image that displays a change over time of the calculated overall cost.

12. The physical distribution simulation system according to claim 6, wherein the input unit enables input of a cost required for the treatment step, the calculation unit calculates an overall cost for the treatment step on a basis of the input cost, and the display unit displays a third display image that displays a change over time of the calculated overall cost.

13. The physical distribution simulation system according to claim 1, wherein the first display image
displays a treatment section in which the treatment step is performed and a storage section in which the container is stored, as the physical distribution process of the container, and
the physical distribution process displays a process over time in which the container enters the treatment section, stays during the treatment time elapsed after the treatment step is performed, leaves the treatment section, enters the storage section, stays during the storage time in the storage step, and leaves the storage section.

14. The physical distribution simulation system according to claim 2, wherein the first display image
displays a treatment section in which the treatment step is performed and a storage section in which the container is stored, as the physical distribution process of the container, and
the physical distribution process displays a process over time in which the container enters the treatment section, stays during the treatment time elapsed after the treatment step is performed, leaves the treatment section, enters the storage section, stays during the storage time in the storage step, and leaves the storage section.

15. The physical distribution simulation system according to claim 3, wherein the first display image displays a treatment section in which the treatment step is performed and a storage section in which the container is stored, as the physical distribution process of the container, and the physical distribution process displays a process over time in which the container enters the treatment section, stays during the treatment time elapsed after the treatment step is performed, leaves the treatment section, enters the storage section, stays during the storage time in the storage step, and leaves the storage section.

16. The physical distribution simulation system according to claim 4, wherein the first display image displays a treatment section in which the treatment step is performed and a storage section in which the container is stored, as the physical distribution process of the container, and the physical distribution process displays a process over time in which the container enters the treatment section, stays during the treatment time elapsed after the treatment step is performed, leaves the treatment section, enters the storage section, stays during the storage time in the storage step, and leaves the storage section.

17. The physical distribution simulation system according to claim 5, wherein the first display image displays a treatment section in which the treatment step is performed and a storage section in which the container is stored, as the physical distribution process of the container, and the physical distribution process displays a process over time in which the container enters the treatment section, stays during the treatment time elapsed after the treatment step is performed, leaves the treatment section, enters the storage section, stays during the storage time in the storage step, and leaves the storage section.

18. The physical distribution simulation system according to claim 1, wherein the waste includes low-level radioactive waste (L3) that is radioactive waste having an extremely low radioactivity level, radioactive waste (CL) that does not need to be treated as radioactive waste, and non-radioactive waste (NR) that is not radioactive waste, the treatment step includes an L3 treatment step for treating the L3 waste, a CL treatment step for treating the CL waste, and an NR treatment step for treating the NR waste, the input unit individually enables input of information regarding generation amounts of the L3 waste, the CL waste, and the NR waste, and the calculation unit individually calculates times from when the L3 waste, the CL waste, and the NR waste are generated to when the L3 waste, the CL waste, and the NR waste are transported through the L3 treatment step, the CL treatment step, and the NR treatment step, respectively.

19. The physical distribution simulation system according to claim 1, wherein the waste includes concrete waste including concrete and metal waste including metal, the treatment step includes a concrete treatment step for treating the concrete waste, and a metal treatment step for treating the metal waste, the input unit enables input of information regarding a generation amount according to types of the concrete waste and the metal waste, and the calculation unit individually calculates times from when the concrete waste and the metal waste are generated to when the concrete waste and the metal waste are transported through the concrete treatment step and the metal treatment step, respectively.

20. The physical distribution simulation system according to claim 19, wherein in a case where the concrete waste and the metal waste are stored in a same storage area, the calculation unit calculates the storage amount over time of the container obtained by totaling the concrete waste and the metal waste, and calculates the storage free capacity with respect to the storage amount, and the display unit displays changes over time of the storage free capacity existing in the storage area and of the storage amount including the concrete waste and the metal waste, in the second display image.

* * * * *